(12) United States Patent
Yaguchi et al.

(10) Patent No.: US 11,268,894 B2
(45) Date of Patent: Mar. 8, 2022

(54) FLOW CELL AND PARTICLE MEASURING DEVICE

(71) Applicant: RION CO., LTD., Kokubunji (JP)

(72) Inventors: Hiroaki Yaguchi, Kokubunji (JP); Yuki Yamakawa, Kokubunji (JP); Masaki Shimmura, Kokubunji (JP); Tomonobu Matsuda, Kokubunji (JP)

(73) Assignee: RION CO., LTD., Tokyo (JP)

( * ) Notice: Subject to any disclaimer, the term of this patent is extended or adjusted under 35 U.S.C. 154(b) by 0 days.

(21) Appl. No.: 17/133,920

(22) Filed: Dec. 24, 2020

(65) Prior Publication Data

US 2021/0199558 A1 Jul. 1, 2021

(30) Foreign Application Priority Data

Dec. 26, 2019 (JP) .............................. JP2019-235640

(51) Int. Cl.
*G01N 15/14* (2006.01)

(52) U.S. Cl.
CPC ..... *G01N 15/1436* (2013.01); *G01N 15/1459* (2013.01); *G01N 2015/1493* (2013.01)

(58) Field of Classification Search
CPC .......... G01N 15/1436; G01N 15/1459; G01N 2015/1493; G01N 2015/1486; G01N 21/05; G01N 21/15; G01N 21/47; G01N 2021/0385

USPC ......................................................... 356/335
See application file for complete search history.

(56) References Cited

U.S. PATENT DOCUMENTS

| 6,440,242 B1 | 8/2002 | Fukazawa |
| 2002/0176075 A1 | 11/2002 | Fukazawa |
| 2018/0038781 A1 | 2/2018 | Matsuda et al. |

FOREIGN PATENT DOCUMENTS

| EP | 1013802 A1 * | 6/2000 | ............. C30B 33/00 |
| JP | H09124400 A * | 5/1997 | ............. C30B 33/06 |
| JP | 2004053580 A | 2/2004 | |
| JP | 5859154 B1 | 2/2016 | |

* cited by examiner

*Primary Examiner* — Roy M Punnoose
(74) *Attorney, Agent, or Firm* — Procopio, Cory, Hargreaves & Savitch LLP

(57) ABSTRACT

A flow cell includes a body and a flow channel. The body is formed out of blocks made of an uniaxial crystal material and joined to one another. The flow channel is formed inside the body, so that the flow cell is configured to be used to measure particles passing through the flow channel based on reception of scattered light generated from the particles. A crystallographic c-axis in a predetermined part of the body is configured to being substantially perpendicular to both a receiving direction and a polarization direction of the scattered light.

4 Claims, 13 Drawing Sheets

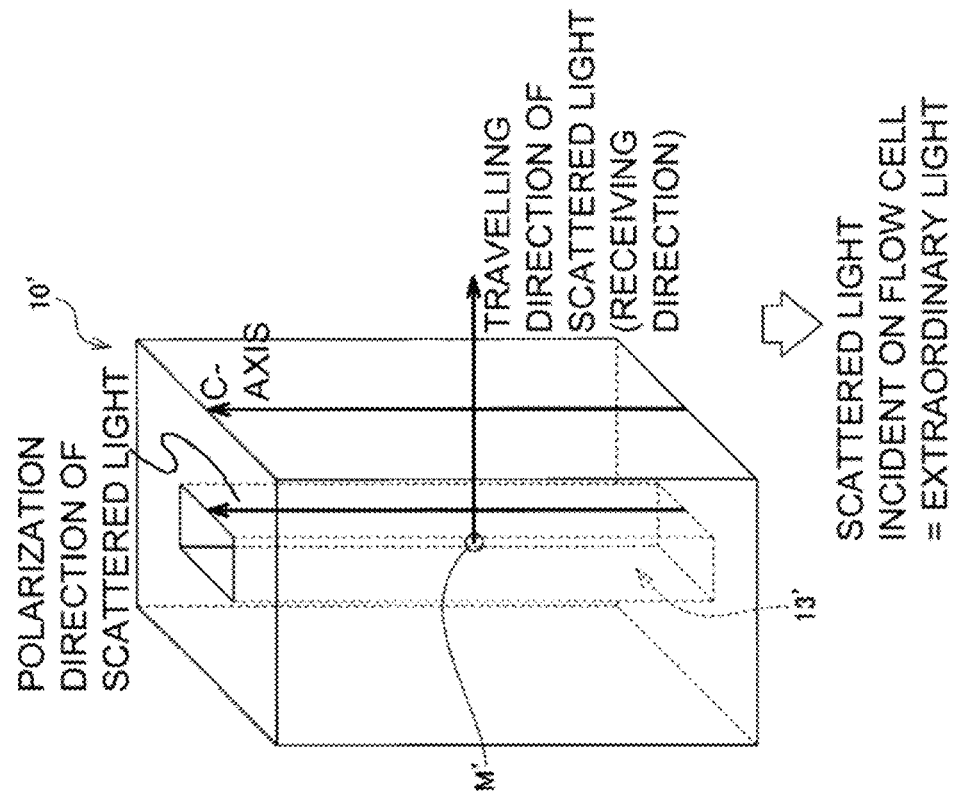
FIG.6A (EMBODIMENT)
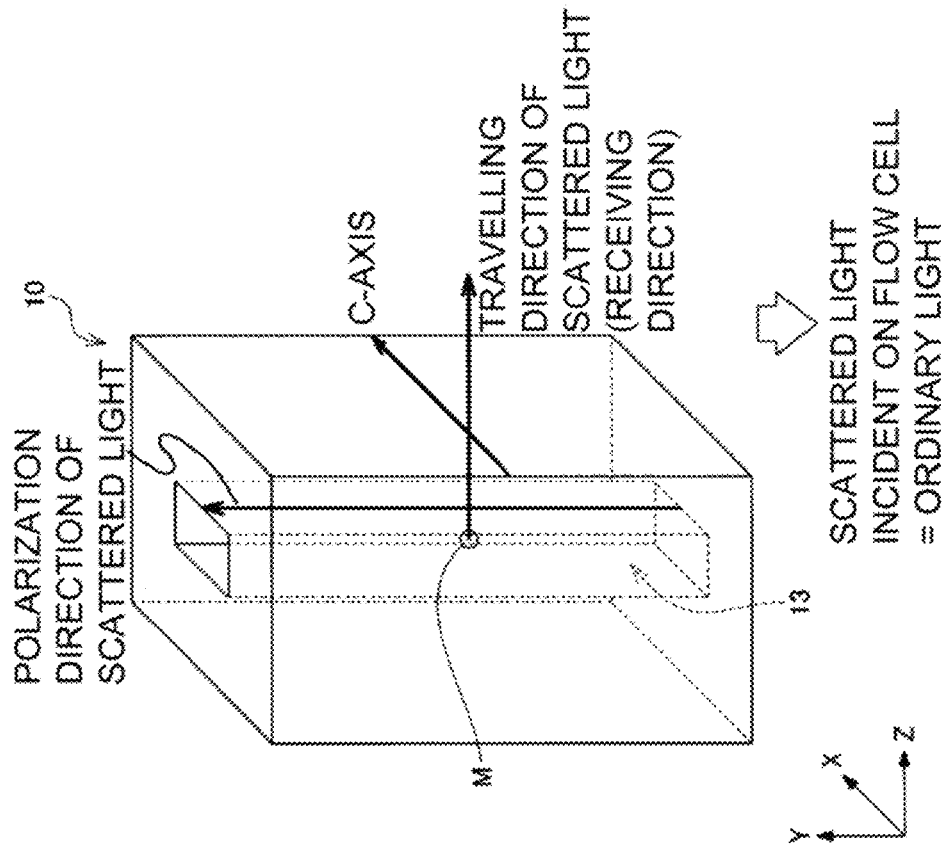
FIG.6B (COMPARATIVE EXAMPLE)

FLOW CELL AND PARTICLE MEASURING DEVICE

CROSS-REFERENCE TO RELATED APPLICATIONS

The present application claims priority from Japanese Patent Application No. 2019-235640, filed Dec. 26, 2019, the entire content of which is incorporated herein by reference.

TECHNICAL FIELD

The present invention relates to a flow cell into which a sample fluid is poured, and a particle measuring device that uses the flow cell to measure particles contained in the sample fluid.

BACKGROUND ART

In the background art, it is general to use a flow cell to detect light in order to count particles contained in a chemical solution. The flow cell is made of a crystalline material such as synthetic corundum excellent in chemical resistance. A flow cell in which a flow channel is provided along a c-axis direction of synthetic corundum has been known as such a flow cell (see PTL 1).

CITATION LIST

Patent Literature

PTL 1: JP-A-2004-053580

According to the aforementioned background art, it is considered that the flow cell having required optical characteristics and required mechanical strength can be produced in a comparatively easy process. In a particle measuring device using the flow cell, scattered light generated due to interaction between irradiation light and particles is detected from the outside of a light transmitting plate. Due to anisotropy of the crystalline material having the optical axis, birefringence occurs when the scattered light passes through the light transmitting plate. On this occasion, polarized light component perpendicular to a plane including the c-axis and a travelling direction of the scattered light serves as ordinary light, while polarized light component parallel to the same plane serves as extraordinary light. It is general to set the polarization direction of the irradiation light perpendicularly to a receiving direction of the scattered light. Therefore, in a case of detecting side scattered light, the polarization direction of the irradiation light is set at a direction in which a flow channel extends. The polarization direction of the scattered light coincides with the polarization direction of the irradiation light. In this case, the polarization direction of the scattered light therefore coincides with the direction in which the flow channel extends, i.e. the c-axis direction of the light transmitting plate, like the polarization direction of the irradiation light. Accordingly the scattered light polarized in the c-axis direction serves as the extraordinary light due to the birefringence.

Here, the refractive index of the ordinary light is constant independently of the angle of the ordinary light with respect to the c-axis, whereas the refractive index of the extraordinary light varies depending on the angle of the extraordinary light with respect to the c-axis. Accordingly, when the scattered light passes through the light transmitting plate, astigmatism occurs in the extraordinary light. The astigmatism causes an increase of a spot size or rotation of a phase. As a result, light condensing performance of an optical system after passing through the light transmitting plate, hence an SN ratio in detection of the light or measurement of the particles, is degraded.

The influence of such extraordinary light remarkably appears particularly in an interference system (e.g. a particle counter described in Japanese Patent No. 5859154) among particle measuring devices. However, in order to detect the scattered light with high accuracy, it is desirable that the extraordinary light does not occur even in a typical light receiving system which is not an interference system.

SUMMARY

Therefore, an object of the present invention is to provide a technique for suppressing extraordinary light from being generated due to birefringence.

In order to solve the foregoing problem, the present invention uses the following flow cell and the following particle measuring device. The following words put in parentheses are merely exemplified, and the present invention is not limited thereto.

The flow cell according to the present invention is a flow cell including: a body formed out of blocks made of an uniaxial crystal material and joined to one another; and a flow channel formed inside the body, so that the flow cell is configured to be used to measure particles passing through the flow channel based on reception of scattered light generated from the particles; wherein a crystallographic c-axis in a predetermined part of the body is configured to being substantially perpendicular to both a receiving direction and a polarization direction of the scattered light. Preferably, a direction of the crystallographic c-axis in the predetermined part of the body and a direction of a crystallographic c-axis in another part of the body are substantially the same. More preferably, the body is formed by joining a crystal face of one type in one of the blocks to a crystal face of the same type in another.

Moreover, the particle measuring device according to the present invention is a particle measuring device including: a flow cell according to any of the aforementioned aspects; a light source configured to emit irradiation light; an irradiation optical system configured to allow the irradiation light to be transmitted through another part of the flow cell than the predetermined part so that a sample solution poured into the flow channel is irradiated with the irradiation light; a condensing optical system configured to condense scattered light generated from particles due to the irradiation with the irradiation light and then transmitted through the predetermined part, the particles being contained in the sample solution and passing through a detection region formed inside the flow channel; light receiving elements configured to receive the condensed scattered light and outputs a signal with a magnitude corresponding to intensity of the scattered light; and a measurement system configured to measure the particles based on the outputted signal, wherein the flow cell is disposed in such a direction that a crystallographic c-axis in the predetermined part of the flow cell is perpendicular to both a receiving direction and a polarization direction of the scattered light. The irradiation light may be transmitted through, of walls of the flow cell, another wall than a wall which is partially formed by the predetermined part, so that the irradiation light is radiated onto the sample fluid.

When the flow cell made of the uniaxial crystal material is irradiated with light, and scattered light generated from the particles passing through the detection region formed inside the flow channel is received, birefringence occurs because the scattered light passes through the wall of the flow cell. On this occasion, polarized light component perpendicular to a plane including the crystallographic c-axis in the wall through which the scattered light passes and the travelling direction (receiving direction) of the scattered light serves as ordinary light while polarized light component parallel to the same plane serves as extraordinary light.

Here, in the particle measuring device according to the aforementioned aspect, the flow cell is disposed in such a direction that the crystallographic c-axis (X-direction) in the predetermined part of the flow cell is perpendicular to both the travelling direction (Z-direction) and the polarization direction (Y-direction) of the scattered light so that the scattered light transmitted through the predetermined part is received. That is, the polarization direction (Y-direction) of the scattered light is perpendicular to the plane (ZX plane) including the c-axis in the wall (predetermined part) through which the scattered light passes and the travelling direction of the scattered light.

BRIEF DESCRIPTION OF DRAWINGS

FIGS. 6A and 6B Views for showing the embodiment and a comparative example in contrast to explain a polarization direction of scattered light in the embodiment and in the comparative example.

DESCRIPTION OF EMBODIMENTS

An embodiment of the present invention will be described below with reference to the drawings. The following embodiment is a preferred example. However, the present invention is not limited to this example.

[Configuration of Flow Cell]

Figure 1:
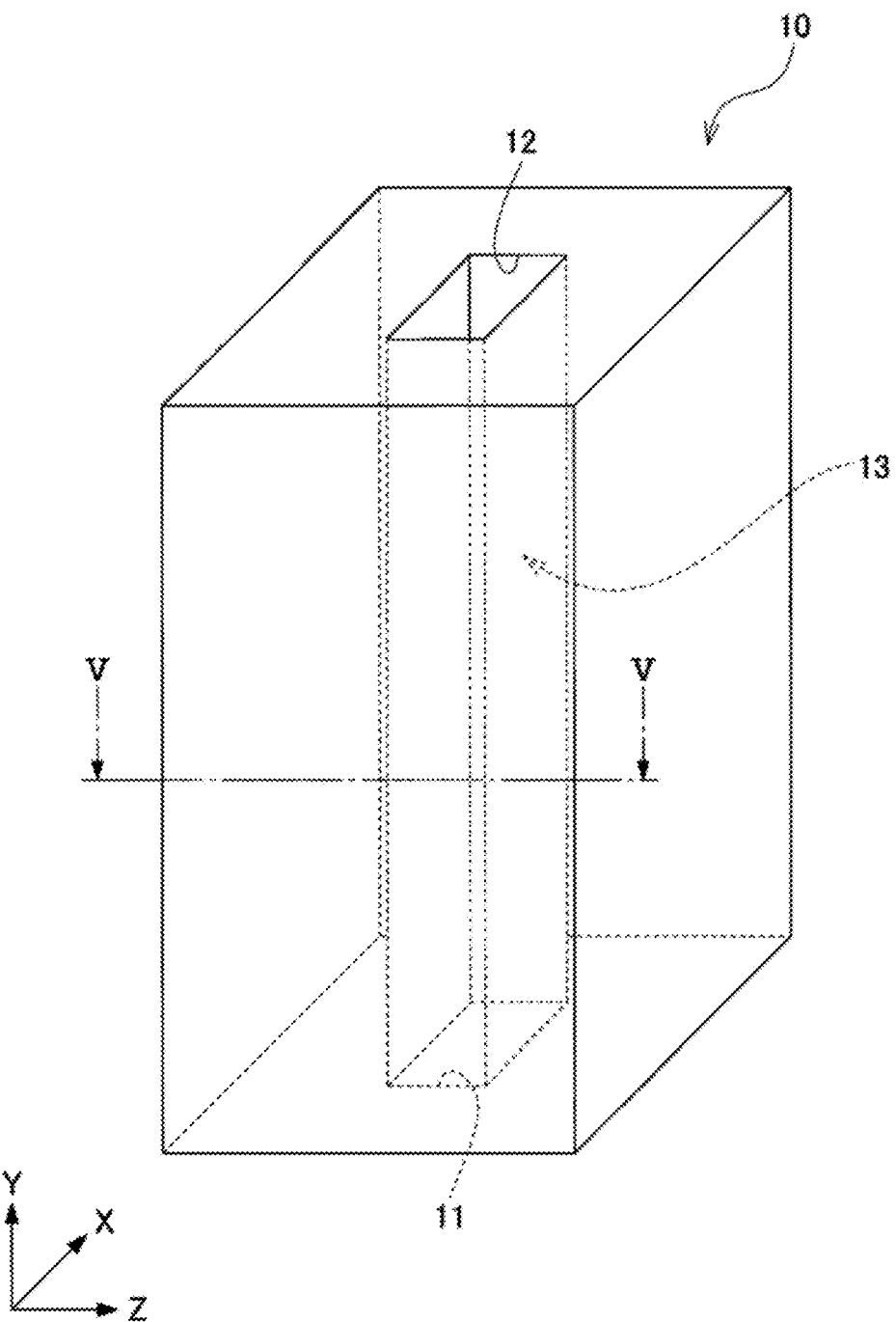
FIG. 1 A perspective view showing a flow cell in an embodiment.

FIG. 1 is a perspective view showing a flow cell 10 in an embodiment.

The flow cell 10 is, for example, formed out of synthetic corundum such as sapphire and substantially shaped like a rectangular parallelepiped. The flow cell 10 has an approximately linear flow channel 13 internally. Specifically, the flow channel 13 shaped like an approximate rectangle in sectional view is formed to extend between a lower opening 11 and an upper opening 12 to penetrate the flow cell 10 substantially linearly. The lower opening 11 is located at a central portion of a bottom face of the flow cell 10. The upper opening 12 is located at a central portion of an upper face of the flow cell 10. The material of the flow cell 10 is not limited to the synthetic corundum (hexagonal crystal system). Any other uniaxial crystal material may be used as the material of the flow cell 10 alternatively. In addition, the shape of the flow channel 13 is not limited to the linear shape. For example, the shape of the flow channel 13 may be a bent shape like an L-shape or a U-shape alternatively. Further, the sectional shape of the flow cell 13 and the shapes or the positions of the openings 11 and 12 are not limited to the aforementioned configuration. For example, the sectional shape of the flow channel 13 may be formed as an approximate circle in place of the approximate rectangle.

From external appearance, the flow cell 10 looks like an integrated body having a seamlessly continuous surface. However, the flow cell 10 is actually formed out of a plurality of blocks made of synthetic corundum and precisely joined to one another. A form in which the plurality of blocks are joined to one another will be further described later with reference to another drawing.

In the following drawings, a direction in which light travels (direction along an optical axis of a condensing optical system, that is, light receiving direction) in a case of detecting the light by use of the flow cell 10 will be described as Z-direction, a direction in which the flow channel 13 extends will be described as Y-direction, and a direction perpendicular to both the Y-direction and the Z-direction will be described as X-direction.

Figure 2:
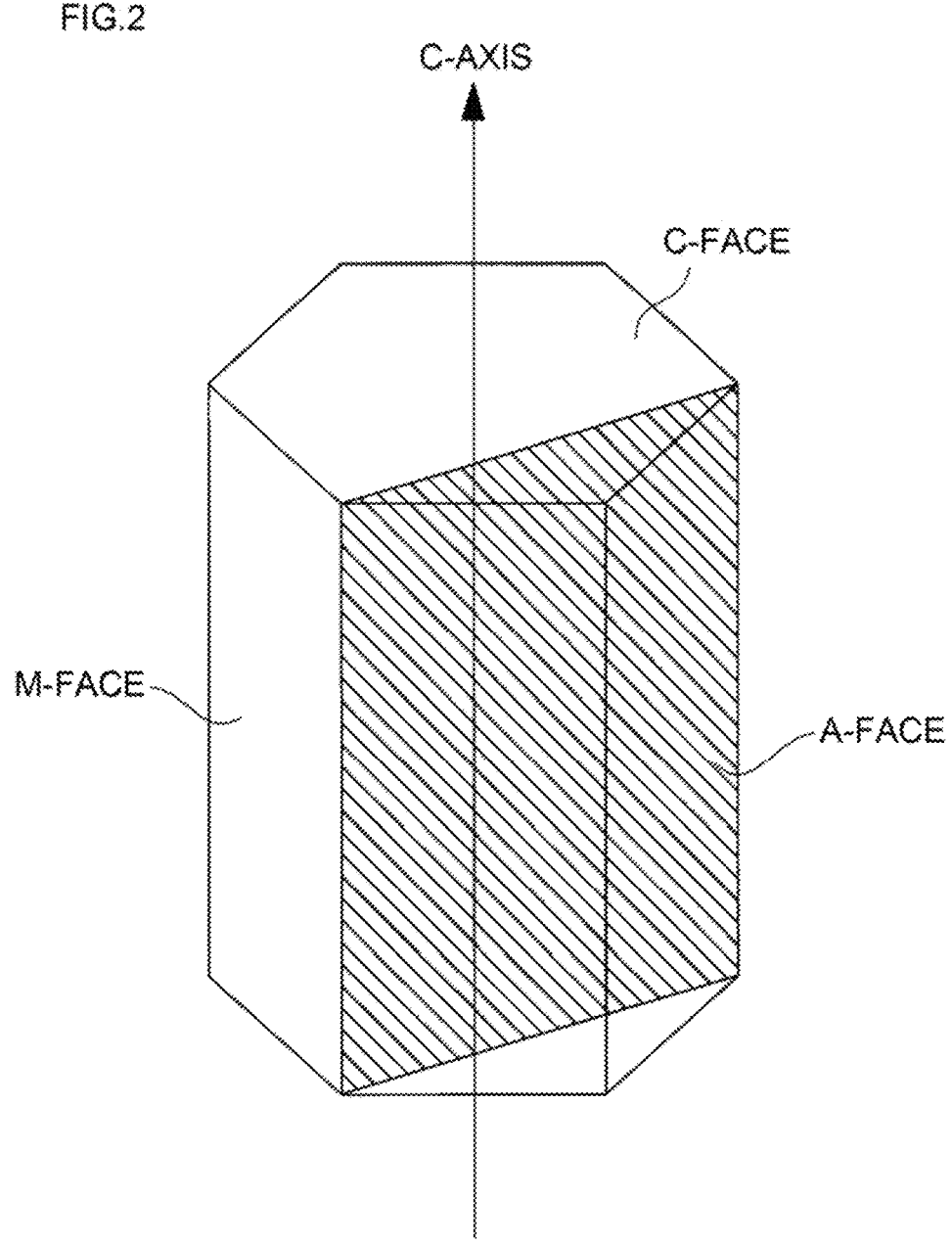
FIG. 2 A view showing the relationship between a c-axis and crystal faces in a unit crystal of synthetic corundum.

FIG. 2 is a view showing the relationship between a c-axis (optical axis) and crystal faces in unit crystal of the synthetic corundum.

As shown in FIG. 2, the unit crystal of the synthetic corundum has a c-face orthogonal to the c-axis, and an m-face parallel to the c-axis. In addition, a crystal face that is generated by cutting the unit crystal and that orthogonal both to the c-face and the m-face is an a-face. Each of the blocks constituting the flow cell 10 is obtained by cutting a bulk single crystal substance made of such unit crystals along the respective directions of the crystal faces. Therefore, each of the blocks constituting the flow cell 10 has the c-face, the a-face and the m-face.

Figure 3:
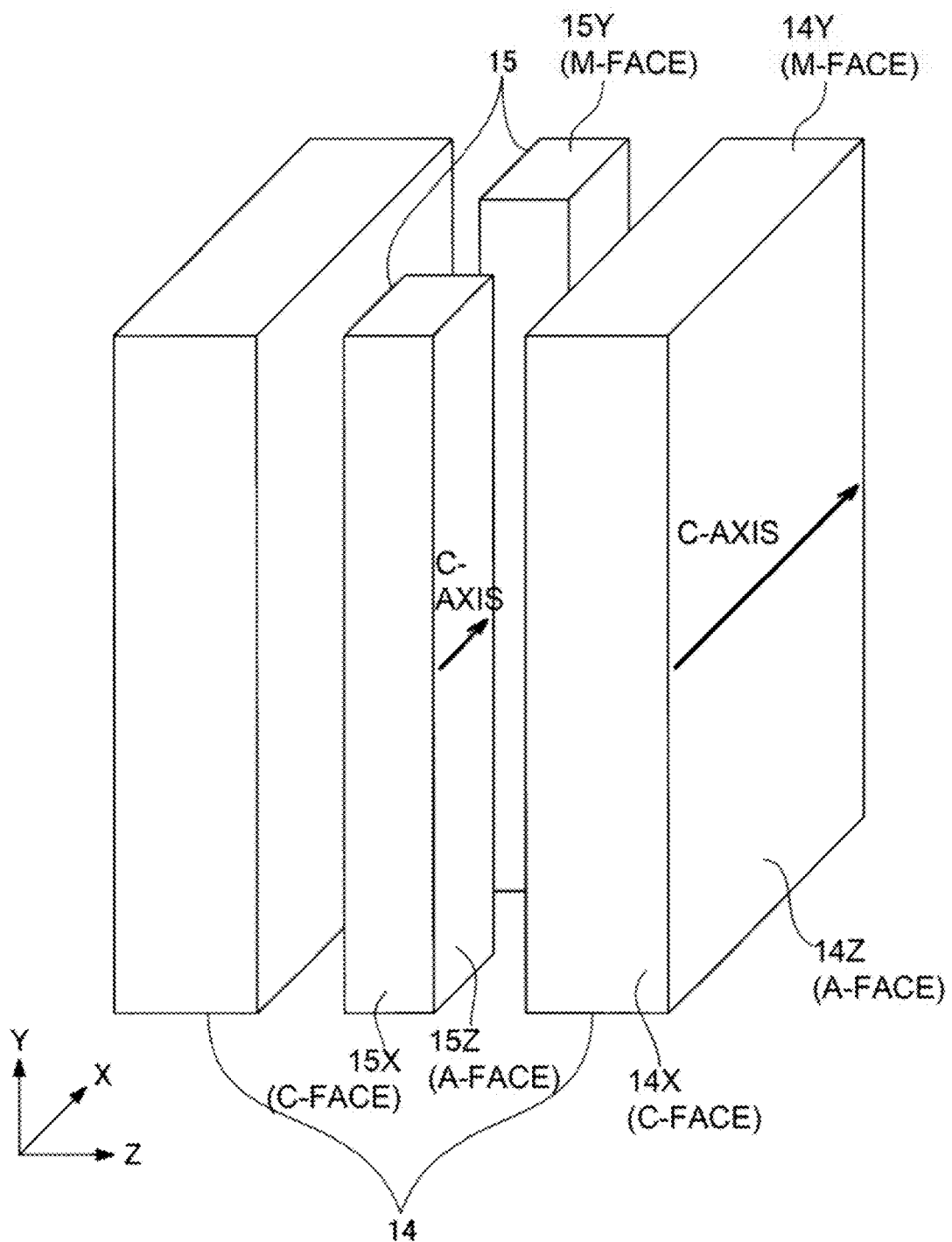
FIG. 3 An exploded perspective view of the flow cell.

FIG. 3 is an exploded perspective view of the flow cell 10 to show the positional relationship among the plurality of blocks when they are joined to one another to form the flow cell 10.

The flow cell 10 is, for example, made of four blocks (pieces) in total, i.e. two first light transmitting plates 14 and two second light transmitting plates 15. The two first light transmitting plates 14 are parallel to each other. The two second light transmitting plates 15 are sandwiched between the first light transmitting plates 14 in a thickness direction thereof to face the first light transmitting plates 14. In each of the first light transmitting plates 14, the c-face is taken in a face $14x$ perpendicular to the X-direction, the m-face is taken in a face $14y$ perpendicular to the Y-direction, and the a-face is taken in a face $14z$ perpendicular to the Z-direction. In each of the second light transmitting plates 15, the c-face is taken in a face $15x$ perpendicular to the X-direction, the m-face is taken in a face $15y$ perpendicular to the Y-direction, and the a-face is taken in a face $15z$ perpendicular to the Z-direction. Then, the faces $14z$ and the faces $15z$, i.e. the a-faces of the blocks facing each other are joined to each other. Thus, the flow cell 10 is formed to have the flow channel 13 at a position surrounded by the four blocks.

That is, the flow cell 10 is formed out of the blocks joined to one another so that the crystallographic c-axis in each part of the flow cell 10 corresponds to the X-direction. For detecting light, light transmitted through the first light transmitting plate 14 to travel in the Z-direction is the target to be detected among light generated due to interaction between particles and irradiation light that is transmitted through any one of the first light transmitting plates 14 (the faces 14z) and the second light transmitting plates 15 (the faces 15x) to enter the flow cell 10. As describing about the c-axis in the first light-transmitting plate 14 through which the light to be detected is transmitted, the c-axis is substantially perpendicular to the thickness direction of the first light-transmitting plate 14 and also substantially perpendicular to the direction in which the flow channel 13 extends.

Incidentally, an error may occur during manufacturing of the flow cell 10 (when the blocks are cut out from the bulk single crystal substance or when the blocks are joined to one another). Therefore, directions of c-axes among the blocks may not perfectly coincide with one another but slight divergence is allowed. In addition, explanation about the c-axis and the c-face have been described above. However, the a-face and the m-face may not have similar configuration to that in the above description. That is, the faces 14y and 15y perpendicular to the Y-direction may be set to correspond to a-faces, and the faces 14z and 15z perpendicular to the Z-direction may be set to correspond to m-faces. In this case, the m-faces of the blocks facing each other are joined to each other to form the flow cell 10.

[Configuration of Particle Measuring Device]

Figure 4:
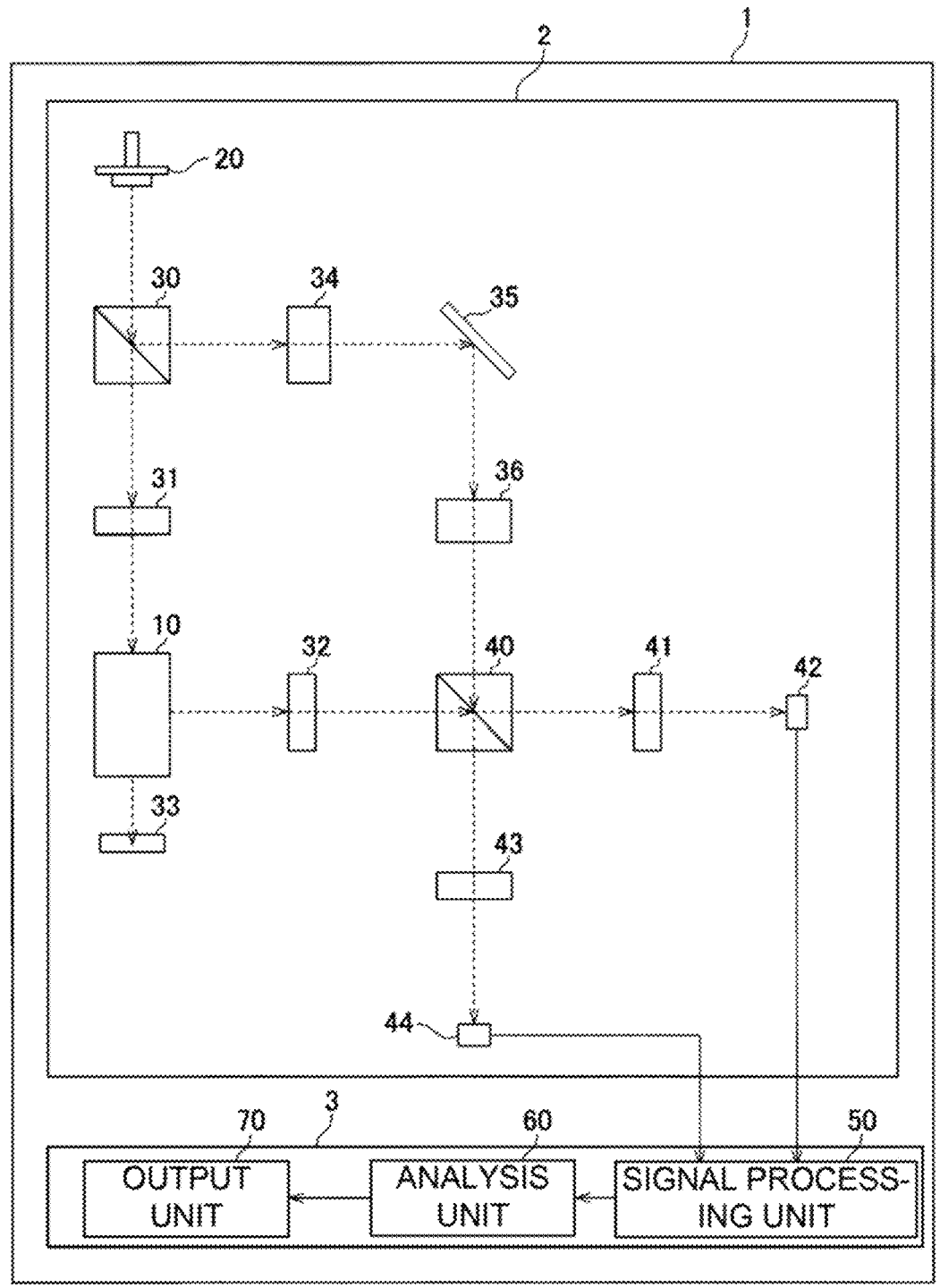
FIG. 4 A block diagram showing a configuration of a particle measuring device according to an embodiment.

FIG. 4 is a block diagram showing a configuration of a particle measuring device 1 in an embodiment.

As shown in FIG. 4, the particle measuring device 1 includes a detection system 2 and a measurement system 3. The detection system 2 is a system that radiates irradiation light onto a sample solution poured into the flow cell 10, and detects light generated due to interaction between particles contained in the sample solution and the irradiation light. The measurement system 3 is a system that measures the particles based on the light detected by the detection system 2.

The detection system 2 is, for example, constituted by the flow cell 10, a light source 20, a beam splitter 30, an illumination lens 31, a light condensing lens 32, a beam damper 33, a beam attenuator 34, a mirror 35, a beam expander 36, a beam splitter 40, light condensing lenses 41 and 43, light receiving elements 42 and 44, and the like.

In the detection system 2, first, light emitted from the light source 20 is split into two by the beam splitter 30. One (irradiation light) of the two lights enters the flow cell 10 via the illumination lens 31 to form a detection region inside the flow channel. Scattered light generated in the detection region is incident on an incidence face of the beam splitter 40 via the light condensing lens 32. In addition, the irradiation light which has passed through the flow cell 10 is absorbed by the beam damper 33. On the other hand, intensity of the other split light (reference light) is attenuated by the beam attenuator 34. Then, the reference light is reflected by the mirror 35 and expanded in beam diameter by the beam expander 36, and is incident on another incidence face of the beam splitter 40. The scattered light and the reference light which are incident on the beam splitter 40 are spatially superimposed on each other so that two interference lights are emitted from different emission faces. The two interference lights are incident on the light receiving elements 42 and 44 via the light condensing lens 41 and 43 to be received (detected) by the light receiving elements 42 and 44 respectively.

In addition, the measurement system 3 is, for example, constituted by a signal processing unit 50, an analysis unit 60, an output unit 70, and the like.

When the interference lights are received by the detection system 2 (the light receiving elements 42 and 44), electric signals having magnitudes corresponding to intensities of the interference lights are outputted. After the signal processing unit 50 has amplified the outputted electric signal V1 corresponding to the first interference light, and the outputted electric signal V2 corresponding to the second interference light if occasions demand, and further applies predetermined processing to the electric signals V1 and V2, the signal processing unit 50 generates detection signals based on the processed electric signals V1 and V2. In addition, the analysis unit 60 performs analysis based on the detection signals generated by the signal processing unit 50, and performs measurement of particles (such as count of the number of the particles or measurement of each of the sizes of the particles). The output unit 70 outputs a result measured by the analysis unit 60.

The configuration of the particle measuring device 1 is merely exemplified. However, the present embodiment is not limited thereto. For example, although a Mach-Zehnder type interference optical system is used in the aforementioned detection system 2, any other interference optical system (such as a Michelson type interference optical system) may be used alternatively.

[Relationship Between Travelling Direction of Scattered Light and C-Axis Orientation]

Figure 5:
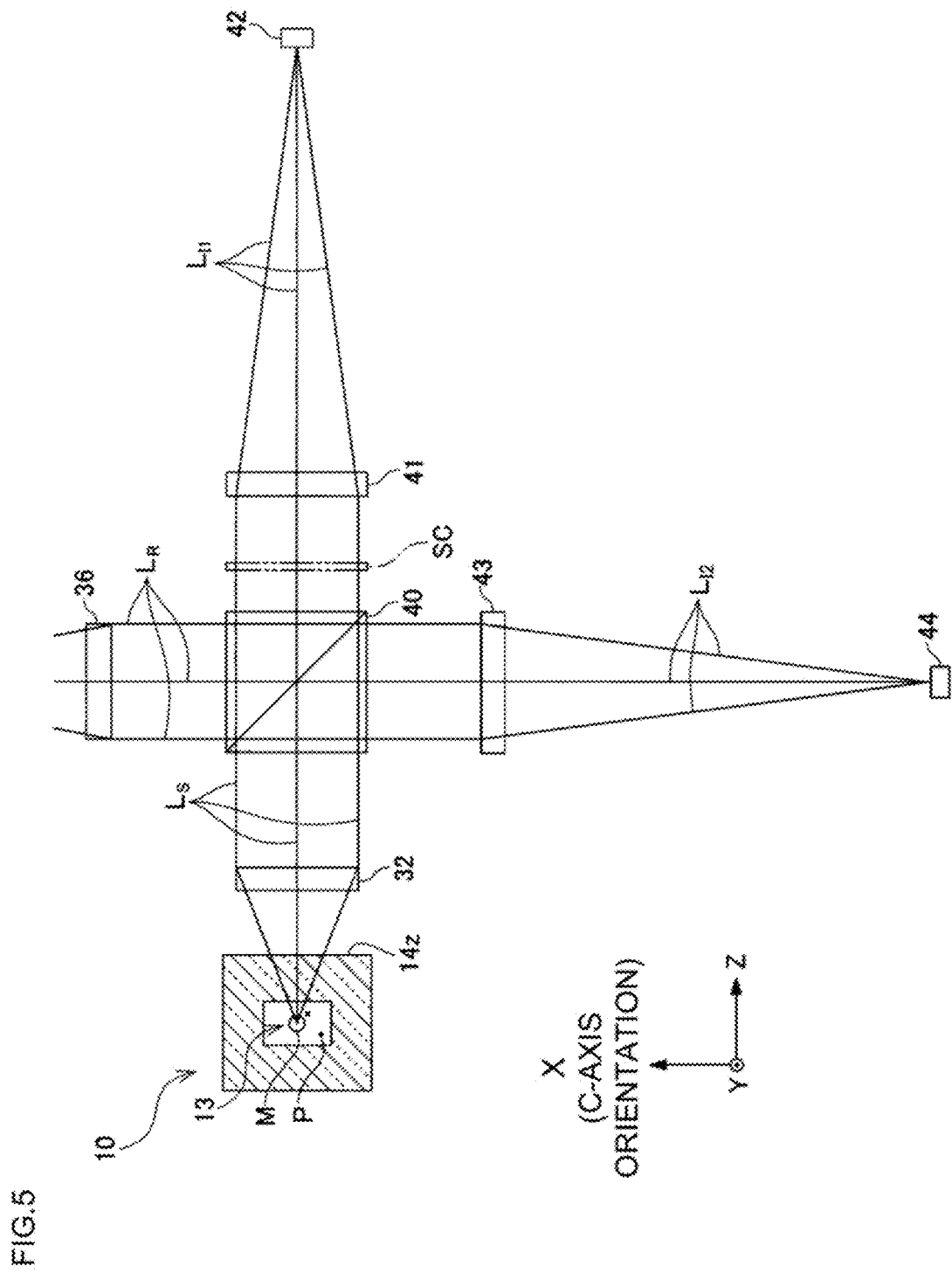
FIG. 5 A view showing the relation of a travelling direction of scattered light to a part of the flow cell.

FIG. 5 is a view showing the relation of a travelling direction of the scattered light to a part of the flow cell 10 to show a configuration relevant to reception of the scattered light extracted in configurations of the detection system 2. A horizontal sectional view of the flow cell 10 taken along a cutting line V-V in FIG. 1 is shown in FIG. 5.

As shown in FIG. 5, the condensing optical system is disposed so that the optical axis of the condensing optical system is perpendicular to the face 14z of the first light transmitting plate 14 forming a part of the flow cell 10 in the present embodiment. In other words, the flow cell 10 is disposed so that the face 14z is perpendicular to the travelling direction of the scattered light. In addition, in the present embodiment, the irradiation light is incident on the flow cell 10 from the X-direction (not shown). Thus, a detection region M is formed inside the flow channel 13.

When particles P contained in a sample fluid poured into the flow channel 13 pass through the detection region M, scattered light is generated due to interaction between the particles P and the irradiation light so that the scattered light travelling in the Z-direction, i.e. side scattered light $L_S$ is transmitted through the first light transmitting plate 14 to be incident on an incidence face of the beam splitter 40. On the other hand, reference light $L_R$ is incident on another incidence face of the beam splitter 40. First interference light $L_{I1}$ in which a transmission component of the scattered light $L_S$ and a reflection component of the reference light $L_R$ have been made to interfere with each other is emitted from an emission face of the beam splitter 40 to be finally received by the light receiving element 42. On the other hand, second interference light $L_{I2}$ in which a reflection component of the scattered light $L_S$ and a transmission component of the reference light $L_R$ have been made to interfere with each other is emitted from another emission face of the beam splitter 40 to be finally received by the light receiving element 44. Thus, the lights in which the side scattered light $L_S$ and the reference light $L_R$ have been made to interfere with each other are received in the detection system 2 according to the present embodiment.

The c-axis is set at the X-direction in the flow cell 10, as described above. Accordingly, the travelling direction (Z-direction) of the scattered light is perpendicular to the c-axis orientation. In the present embodiment where the side scattered light is received, the irradiation light is incident on the flow cell 10 from the X-direction so that the polarization direction of the irradiation light is made to correspond to the Y-direction. Accordingly, the polarization direction of the scattered light is also made to correspond to the Y-direction. Since a slight inclination may occur in the incidence direction of the irradiation light, the polarization direction is not perfectly parallel to the Y-direction, that is, a slight inclination may occur.

[Relationship Between Polarization Direction of Scattered Light and C-Axis Orientation]

FIGS. 6A and 6B are views for showing the embodiment and a comparative example in contrast to explain a polarization direction of scattered light in the embodiment and in the comparative example. FIG. 6A shows the relationship between the polarization direction of the scattered light and a c-axis orientation in the embodiment. FIG. 6B shows the relationship between the polarization direction of the scattered light and a c-axis orientation in a case where a synthetic corundum cell (flow cell 10') described in the aforementioned PTL 1 was used as the comparative example.

FIG. 6A: The c-axis in a part (a first light transmitting plate 14 which has not been joined yet) forming a wall of the flow cell 10 on a side where the scattered light will be received is set at the X-direction. In addition, the travelling direction of the scattered light corresponds to the Z-direction, and the polarization direction of the scattered light corresponds to the Y-direction. The polarization direction (Y direction) of the scattered light is perpendicular to a plane (ZX plane) including the travelling direction (Z-direction) of the scattered light and the c-axis (X-direction). Accordingly, the scattered light incident on the part forming the wall on the side where the scattered light will be received serves as ordinary light. Accordingly, in the embodiment, extraordinary light can be suppressed to be generated due to birefringence when the scattered light passes through the first light transmitting plate 14. Therefore, for the reception of the scattered light, it can be implemented to reduce influence by the extraordinary light.

FIG. 6B: On the other hand, in the comparative example, the c-axis in a part forming a wall of the flow cell 10' on a side where the scattered light will be received is set at the Y-direction. A travelling direction and the polarization direction of the scattered light are the same as those in the embodiment. On this occasion, the polarization direction (Y-direction) of the scattered light is parallel to a plane (YZ plane) including the travelling direction (Z-direction) of the scattered light and the c-axis (Y-direction). Accordingly, the scattered light incident on the part forming the wall on the side where the scattered light will be received serves as extraordinary light. Accordingly, in the comparative example, the extraordinary light is easily generated due to birefringence when the scattered light passes through the first light transmitting plate 14. Therefore, the reception of the scattered light is easily influenced by the extraordinary light.

Figure 7:
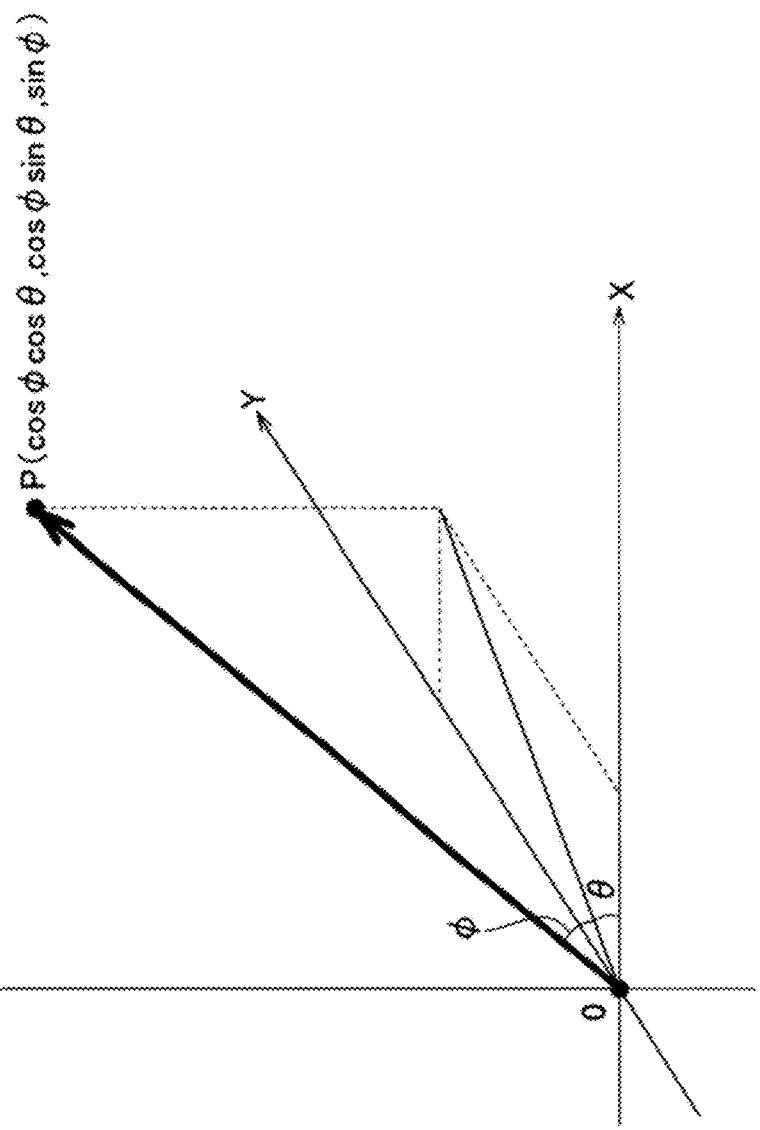
FIG. 7 A view for examining energy of a light ray when a c-axis orientation is set at an X-direction.

FIG. 7 is a graph for examining energy of a light ray when the c-axis orientation is set at the X-direction. A unit direction vector OP=(cos φ cos θ, cos φ sin θ, sin) is shown in FIG. 7. With the direction of the optical axis (the travelling direction of the light) set at (0, 0, 1) and the polarization direction on the optical axis set at (0, 1, 0), the light ray in the direction vector OP is examined as follows.

When the c-axis orientation is set at (1, 0, 0), a normal line of a plane formed by the c-axis and the light ray can be expressed by the following direction vector.

$$(1,0,0) \times (\cos φ \cos θ, \cos φ \sin θ, \sin φ) = (0, -\sin φ, \cos φ \sin θ) \quad (1)$$

In addition, a plane using the light ray as a normal line, i.e. a plane perpendicular to the light ray can be expressed by the following expression.

$$(\cos φ \cos θ)x + (\cos φ \sin θ)y + (\sin φ)z = 0$$

Further, since it is considered that the polarization direction of the light ray has a vector whose X-direction component is 0 in the plane perpendicular to the light ray, the polarization direction of the light ray can be expressed by the following direction vector.

$$(0, 1, -\cos φ \sin θ / \sin φ) \quad (2)$$

Here, the direction vectors expressed by the of expressions (1) and (2) are parallel to each other. Accordingly, the entire energy of the light ray expressed by the direction vector OP serves as ordinary light. Thus, when the light ray is scattered light, the entire energy of the scattered light serves as ordinary light.

From the examination result, the c-axis is set at the X-direction, the travelling direction of the scattered light is set at the Z-direction, and the polarization direction of the scattered light is set at the Y-direction, i.e. the c-axis is set perpendicularly to both the travelling direction and the polarization direction of the scattered light. Thus, it is also theoretically obvious that the scattered light can be used as ordinary light so that extraordinary light can be suppressed from being generated due to birefringence.

[Spot Size]

Figure 8:
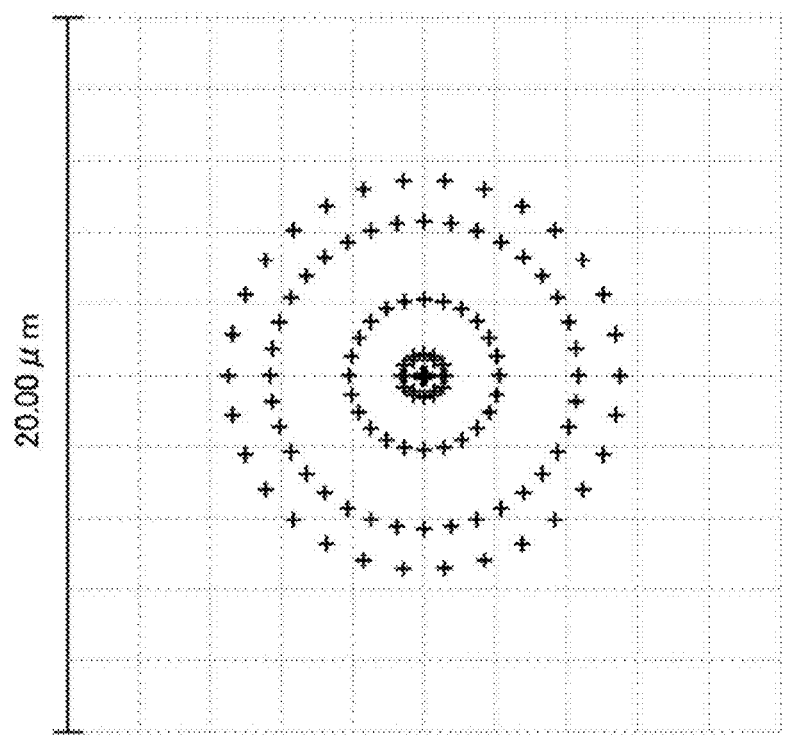
FIG. 8 A view showing a spot size of reference light.

FIG. 8 is a view showing a spot size of reference light in an image plane.

The size of an area shown in FIG. 8 is 20 μm square, and the size of one scale is 2 μm. It can be known that a spot of the reference light falls into an area 12 μm square.

Figure 9A:
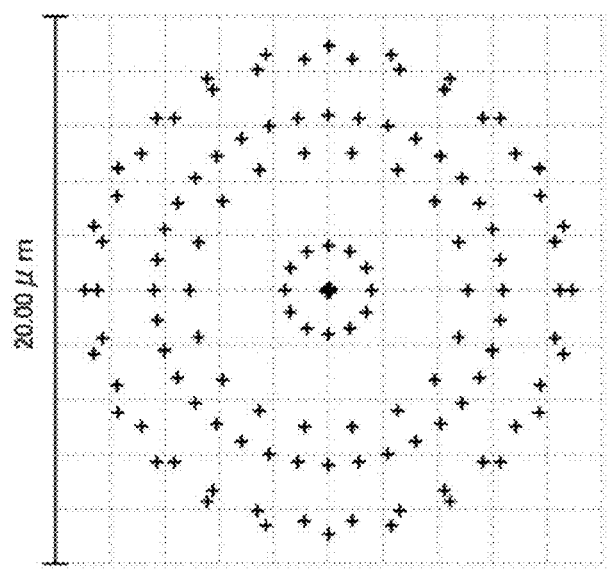
FIGS. 9A and 9B Views showing spot sizes of scattered lights.
Figure 9B:
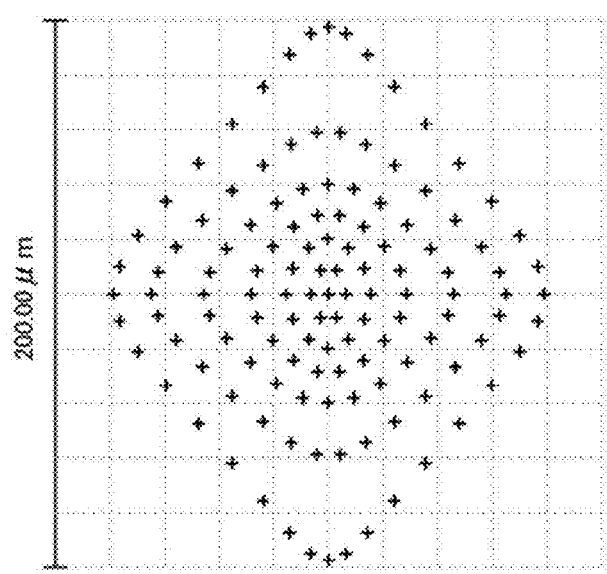

FIGS. 9A and 9B are views showing spot sizes of scattered lights in image planes. FIG. 9A shows the spot size of the scattered light received by use of the flow cell 10 according to the aforementioned embodiment, i.e. the scattered light in a case where extraordinary light is suppressed from being generated (ordinary scattered light). FIG. 9B shows the spot size of the scattered light received by use of the flow cell 10' in the aforementioned comparative example, i.e. the scattered light in a case where extraordinary light is not suppressed from being generated (extraordinary scattered light).

FIG. 9A: The spot of the ordinary scattered light falls into the area 20 μm square, which is nearly as large as the spot size of the reference light shown in FIG. 8. As the result, it can be known that, in the case where extraordinary light is suppressed from being generated, energy of the scattered light can be used effectively. Because the most part of the scattered light can overlap the reference light, when the scattered light and the reference light are superimposed on each other.

FIG. 9B: On the other hand, the spot of the extraordinary scattered light expands to an area 200 μm square, which is about 10 times as large as the spot size of the reference light or the ordinary scattered light. As the result, it can be known that, in the case where extraordinary light is not suppressed from being generated, most of energy of the scattered light is wasted. Because the most part of the scattered light does not overlap the reference light, when the scattered light and the reference light are superimposed on each other.

[Phase Distribution]

Figure 10:
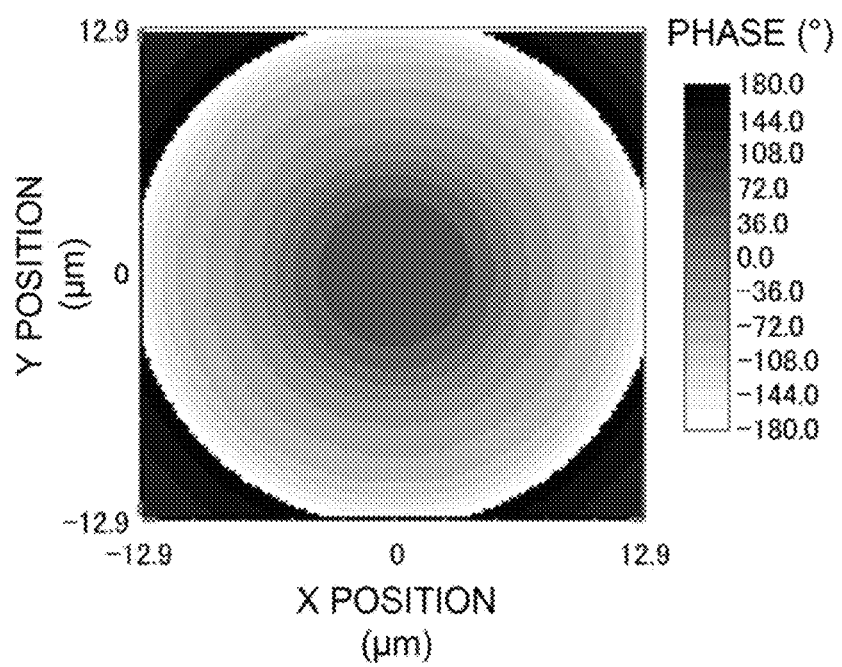
FIG. 10 A view showing a phase distribution of the reference light.
Figure 11A:
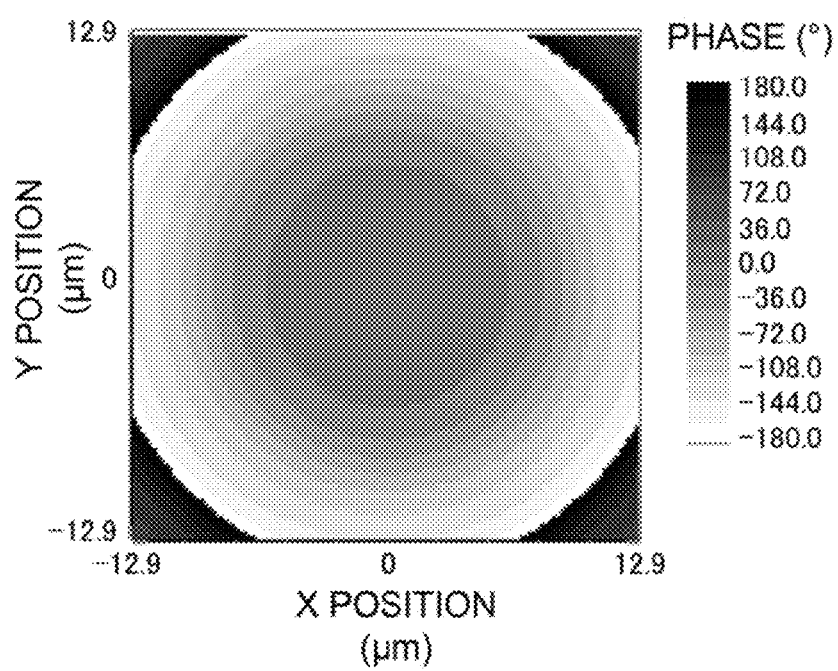
FIGS. 11A and 11B Views showing phase distributions of the scattered lights.
Figure 11B:
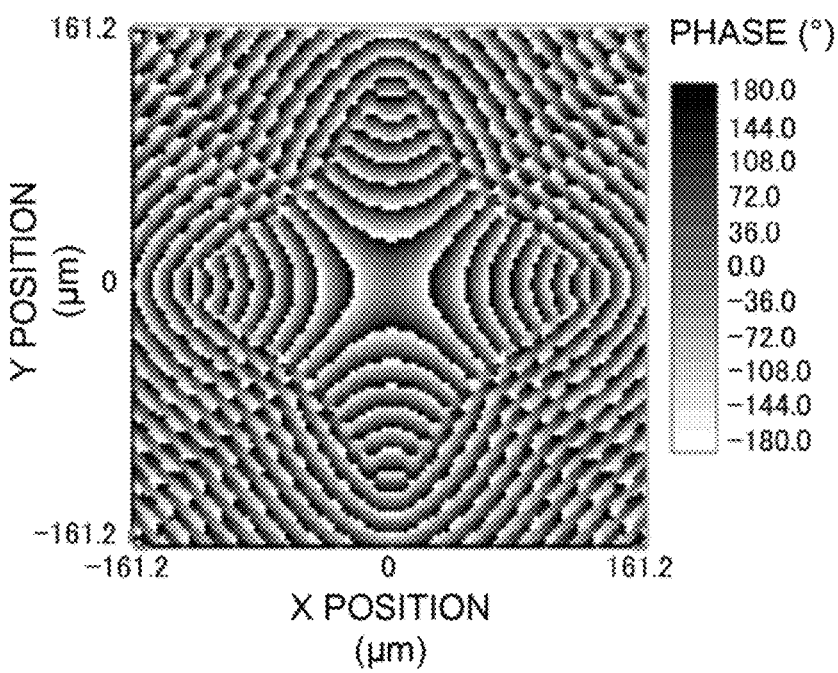

FIG. 10 is a view showing a phase distribution of reference light when the reference light forms an image on the light receiving element. FIGS. 11A and 11B are views each showing a phase distribution of scattered light when the scattered light forms an image on the light receiving element. FIG. 11A shows the phase distribution of the ordinary scattered light. FIG. 11B shows the phase distribution of the extraordinary scattered light. Both the phase distributions are formed by simulation.

As shown in FIG. 10 and FIG. 11A, the phase distribution of the reference light and the phase distribution of the ordinary scattered light approximately coincide with each other. As the result, the following consideration can be made. That is, in the case where extraordinary light can be suppressed from being generated, the phases of the reference light and the scattered light are easily aligned with each other so that excellent interference can be produced between the reference light and the scattered light. Therefore, intensity of a signal during reception of the light can be increased and an SN ratio can be improved.

On the other hand, as shown in FIG. 11B, the phase distribution of the extraordinary scattered light has a very complicated shape to be totally different from the phase distribution of the reference light. As the result, the following consideration can be made. That is, in the case where extraordinary light cannot be suppressed from being generated, the phases of the scattered light and the reference light are hardly aligned with each other so that it is difficult to produce excellent interference between the reference light and the scattered light. Therefore, intensity of a signal during reception of the light, hence an SN ratio, naturally decreases.

[Variation of Interference Fringes Due to Change of C-Axis Orientation]

Figure 12A:
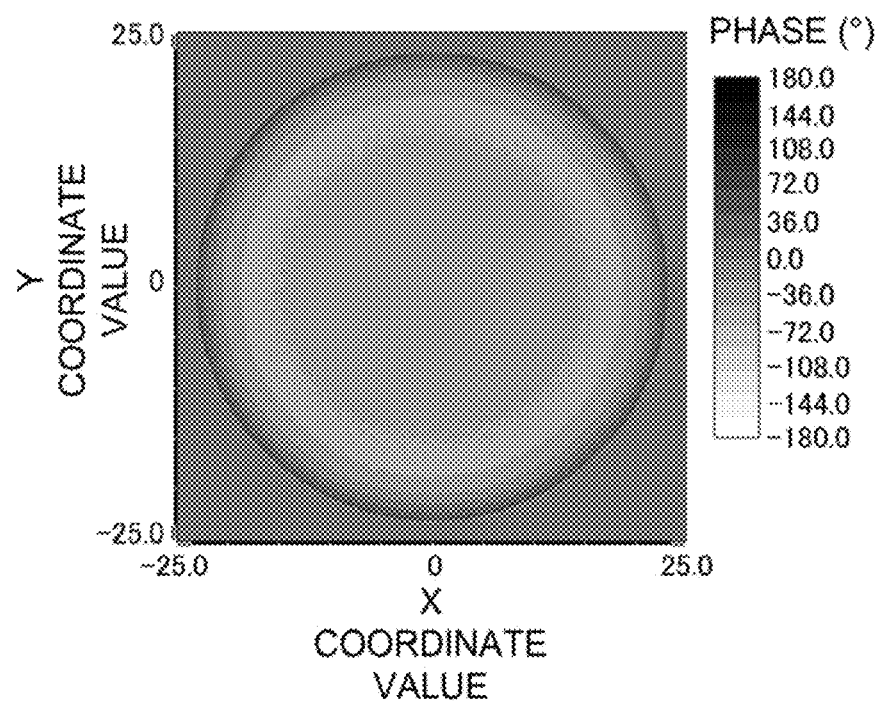
FIGS. 12A and 12B Views showing an experiment result in a case (the embodiment) where the c-axis orientation was set at the X-direction.
Figure 12B:
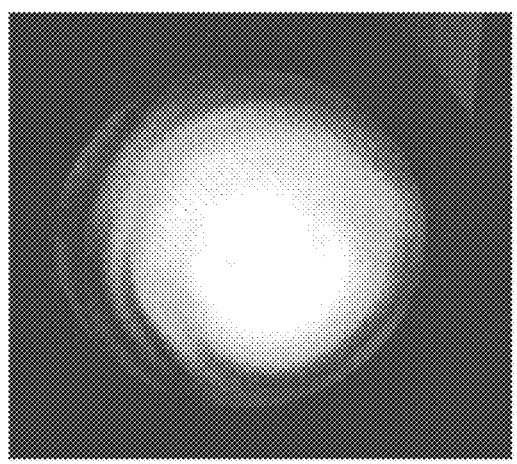
Figure 13A:
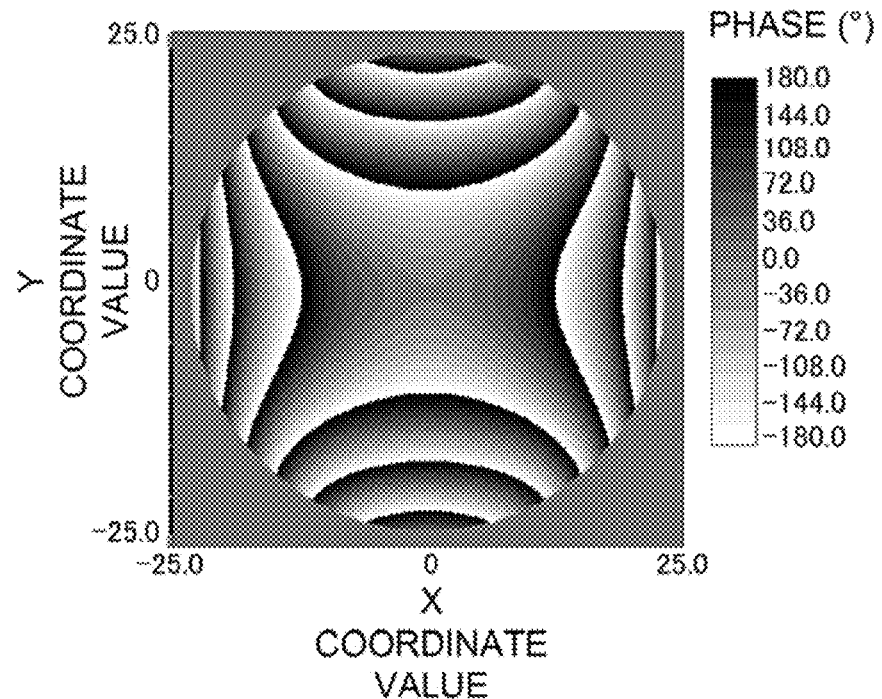
FIGS. 13A and 13B Views showing an experiment result in a case (the comparative example) where the c-axis orientation was set at a Y-direction.
Figure 13B:
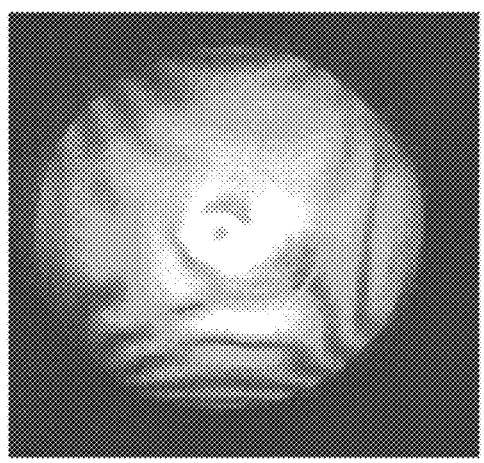

FIGS. 12A and 12B and FIGS. 13A and 13B are views for explaining results in each of which a variation in an appearance status of interference fringes due to a change in the c-axis orientation was confirmed by experiment. FIGS. 12A and 12B show the experiment result in the embodiment. FIGS. 13A and 13B show the experiment result in the comparative example.

In the experiment, a pinhole was disposed at a position which should be a scattered light emission point inside the flow cell, and a screen was disposed at a position between the beam splitter 40 and the light condensing lens 41 (specifically, a position designated by a dashed-two-dotted line SC in FIG. 5). Light diffracted by the pinhole and reference light were made to interfere with each other by the beam splitter 40. Interference light reflected on the screen was imaged so that the appearance status of the interference fringes was confirmed. FIG. 12A and FIG. 13A show simulation results of the phase distributions of the scattered lights at the screen positions, and FIG. 12B and FIG. 13B show photos in which the states of the lights were imaged at the screen positions.

FIGS. 12A and 12B show the experiment result in the case where the flow cell 10 according to the embodiment was used, i.e. in the case where the c-axis orientation was set at the X-direction. From the phase distribution of FIG. 12A, it is considered that phase rotation of the scattered light did not occur in the embodiment. In addition, to back up the simulation result, no interference fringe occurred and the diffracted light and the reference light were excellently superimposed on each other almost entirely to result in intense light in the photo of FIG. 12B. In the embodiment, such light was finally received. Thus, intensity of an outputted signal was high.

FIGS. 13A and 13B show the experiment result in the case where the flow cell 10' according to the comparative example was used, i.e. in the case where the c-axis orientation was set at the Y-direction. From the phase distribution of FIG. 13A, it is considered that phase rotation of the scattered light occurred in the comparative example. As described above, when the scattered light passed through the flow cell 10', the scattered light served as extraordinary light due to birefringence so as to cause astigmatism in the comparative example. Therefore, it can be said that the phase rotation was caused by the extraordinary light. In addition, to back up the simulation result, the phase rotation of the scattered light caused by the astigmatism was reflected and hyperbolic interference fringes occurred in the photo of FIG. 13B. During reception of light, a signal with intensity corresponding to intensity integrated all over the light was outputted. Accordingly, the intensity of the signal outputted in the comparative example was low.

[Advantages of Present Invention]

According to the aforementioned embodiment as described above, the following effects can be obtained.

(1) Birefringence occurs when light passes through the flow cell 10. However, the crystallographic c-axis in the part (one of the first light transmitting plates 14 which has not been joined yet) forming the wall on the side where light will be received is made perpendicular to both a travelling direction and a polarization direction of the light. Accordingly, scattered light generated due to interaction between particles P contained in a sample fluid poured into the flow channel 13 and irradiation light can be used as ordinary light when the scattered light passes through the flow cell 10 (the first light transmitting plate 14 which has not been joined yet). As a result, extraordinary light can be suppressed from being generated.

(2) By use of the flow cell 10, extraordinary light is suppressed from being generated due to birefringence so that occurrence of astigmatism can be reduced and occurrence of an increase in the spot size or rotation of the phase can be also reduced. Accordingly, excellent interference can be produced between the scattered light and reference light so that intensity of an electric signal outputted during reception of the light can be increased. As a result, an SN ratio in detection of the light and measurement of the particles can be improved.

The present invention is not limited to the aforementioned embodiment, but can be modified variously and carried out.

In the aforementioned embodiment, the flow cell 10 is constituted by the four blocks in total, i.e. the two first light transmitting plates 14 and the two second light transmitting plates 15. However, the number of the blocks is not limited thereto. In parts forming the flow cell, the crystallographic c-axis in a part which the received scattered light is transmitted may be set at the X-direction, the X-direction being perpendicular to both the travelling direction and the polarization direction of the scattered light, and the part may be constituted by a single block. Any of the other parts may be formed by joining a plurality of blocks to one another.

In the aforementioned embodiment, the linear shape is used as the shape of the flow channel 13. However, any other shape (such as an L-shape or a V-shape) may be used alternatively. In this case, in parts forming the flow cell, the crystallographic c-axis in a part which the received scattered light is transmitted may be set at a direction perpendicular to both the travelling direction and the polarization direction of the scattered light, and the part may be constituted by a single block. Even with such a configuration, extraordinary light can be suppressed from being generated similarly to the case where the aforementioned flow cell 10 is used.

In the aforementioned embodiment, the side scattered light is received. However, the scattered light to be received is not limited to the side scattered light. Even when scattered light having any direction is received, directions or positions of optical axes of the illumination optical system and the condensing optical system with respect to the flow cell 10 may be adjusted to make the c-axis in the first light transmitting plate 14 perpendicular to both a travelling direction and a polarization direction of the scattered light.

In the aforementioned embodiment, the interference optical system is used in the detection system 2. However, a non-interference optical system may be used alternatively. By use of the flow cell 10, extraordinary light can be suppressed from being generated even in a case where scattered light is received by the non-interference optical system. Accordingly, an SN ratio in the detection system can be improved so that particles can be counted accurately in the measurement system 3.

In addition, the materials, the numerical values, or the like, mentioned as the configuration examples of the flow cell 10 and the particle measuring device 1 are merely exemplified. It is a matter of course that the present invention can be modified suitably when the present invention is carried out.

The invention claimed is:

1. A flow cell comprising:
   a body formed out of blocks made of an uniaxial crystal material and joined to one another; and
   a flow channel formed inside the body, so that the flow cell is configured to be used to measure particles passing through the flow channel based on reception of scattered light generated from the particles;
   wherein a crystallographic c-axis in a predetermined part of the body is configured to being substantially perpendicular to both a receiving direction and a polarization direction of the scattered light.

2. The flow cell according to claim 1, wherein a direction of crystallographic c-axis in the predetermined part of the body and a direction of a crystallographic c-axis in another part of the body are substantially the same.

3. The flow cell according to claim 1, wherein the body is formed by joining a crystal face of one type in one of the blocks to a crystal face of the same type in another.

4. A particle measuring device comprising:
   a flow cell according to claim 1;
   a light source configured to emit irradiation light;
   an irradiation optical system configured to allow the irradiation light to be transmitted through another part of the flow cell than the predetermined part so that a sample solution poured into the flow channel is irradiated with the irradiation light;
   a condensing optical system configured to condense scattered light generated from particles due to the irradiation with the irradiation light and then transmitted through the predetermined part, the particles being contained in the sample solution and passing through a detection region formed inside the flow channel;
   light receiving elements configured to receive the condensed scattered light and outputs a signal with a magnitude corresponding to intensity of the scattered light; and
   a measurement system configured to measure the particles based on the outputted signal,
   wherein the flow cell is disposed in such a direction that a crystallographic c-axis in the predetermined part of the flow cell is perpendicular to both a receiving direction and a polarization direction of the scattered light.

* * * * *